Patented July 16, 1935

2,008,103

UNITED STATES PATENT OFFICE 2,008,103

MANUFACTURE OF A SHELLAC SUBSTITUTE

Julius Hyman, Chicago, Ill., assignor to Velsicol Corporation, Chicago, Ill., a corporation of Illinois No Drawing. Application December 7, 1934, Serial No. 756,481

9 Claims. (Cl. 260—2)

This invention relates to the manufacture of a shellac substitute and is more particularly directed to the production of a shellac substitute from mineral drying oils and to certain novel process features involved in the manufacture thereof.

When cracked gasolines are treated with catalytically active solid silicates, such as diatomaceous earth, or with acidic substances, such as hydrochloric or sulphuric acids, or solutions of zinc chloride or the like, there occurs a polymerization of the more active ingredients in the gasoline, with the formation of polymers whose boiling range, if indeed they volatilize at all, is above that of the original gasoline. If the polymerization has been carried on under suitable conditions of temperature, pressure, contact time and contact activity, the resulting polymers, when reduced to approximately a 50% solids content as measured by the A. S. T. M. method for the determination of solids in varnishes, will possess iodine numbers (Wijs) above 100, and dry to touch in thin films at ordinary room temperatures and ordinary natural illumination within 100 hours. Polymers have already been found possessing iodine numbers in excess of 300, and drying times of less than three hours. The processes of Gray, Ellis, Lachman, Day, Osterstrom, Hyman and others are capable of producing polymers of the aforementioned characteristics, it being borne in mind that the lower the polymerization temperatures, pressures and catalyzing activity of the catalyst, and the shorter the contact time between the gasoline and catalyst, the more unsaturated and reactive will be the resulting polymers. In general, also, the more highly unsaturated the starting distillate is, the more highly unsaturated will be the resulting polymers, other things being equal.

Polymers formed as herein described are characterized by complete solubility in the ordinary petroleum spirits, but show a very restricted solubility at room temperatures in solvents such as acetone, 95% ethyl alcohol or furfural.

I have found that when the polymers previously described are subjected, in liquid phase, to the action of molecular oxygen at temperatures not in excess of 220° F., preferably in the presence of a small quantity of an oil-soluble siccative metal soap, there results a chemical interaction between the oxygen and a portion of the polymers. I have found the oxidized polymers to possess a very reduced solubility in the ordinary petroleum naphthas, and I have based a separation of the properly oxidized portions of the polymers from the less completely or unoxidized portions on this discovery. But whereas the solubility of the oxidized polymers in ordinary petroleum naphtha at room temperature is very low, they show a comparatively high degree of solubility in acetone, 95% ethyl alcohol and furfural.

The oxidation may be carried out with ordinary air, or with oxygen in a more concentrated form, and at normal or at super-atmospheric pressures. In general, the greater the oxygen partial pressure, the more rapid will be the oxidation.

It has been found distinctly advantageous to keep the solids content of the polymeric solution to be treated below 60%. When the solids content of the polymers rises above this value, the rate of oxidation appears to decrease markedly. On the other hand, when the solids content of the polymers lies below, let us say, 10%, the oxidation process tends to become uneconomical. A solids content of 40% for the polymers to be treated has been found by me to be an easily oxidizable and economical concentration. I do not wish, however, to be limited to the figures just quoted, but give them merely as illustrative and for the guidance of those who wish to practice the art.

The temperature at which oxidation is carried out should not exceed 220° F., as higher temperatures appear to decompose the oxidized products. Indeed, temperatures below 200° F. are often to be preferred; while pressure oxidations may be carried on at room temperatures. The temperature of 150° to 175° F., has been found by me as a very suitable temperature for atmospheric oxidation.

The oxidation is accelerated considerably by the presence of an oil-soluble siccative metal soap. Soaps of such metals as cobalt and manganese are especially suitable although soaps of many other heavy metals have been found useful. The quantity of soap used may vary at the discretion of the operator. Pressure oxidations often take place rapidly enough to require no special catalyst. For oxidations at ordinary pressures, from .01 to .1% of siccative metal, the percentage referring to the solids content of the polymers, may be used effectively. I quote the above figures for the purpose of illustration only.

If the oxidation is carried out by agitating the polymers with a current of air, a certain amount of volatile constituents will be carried off in entrainment with the air. If desired, these volatile components may be condensed by suitable means and returned to the reaction chamber periodically. Or, suitable reflux means may be constructed whereby the volatile constituents may be returned continuously to the reaction chamber. Or, fresh material may be added, periodically or continuously, to the reaction chamber to compensate for the evaporation losses.

In view of the fact that shellac substitutes, to be effective must show little if any solubility in the ordinary petroleum solvents, this factor is given leading importance in the present invention. After the oxidation has been continued to a point where, in the opinion of the operator, the reaction may feasibly be concluded, the treated mass is mixed with a quantity of ordinary petroleum naphtha. Whether or not the treated mass should first be cooled may be left to the discretion of the operator. The volume of naphtha used should preferably not be less than equal that of the reacted mass, and may preferably be from two to four times this volume. If the oxidation has been carried out properly, the addition of naphtha will cause a voluminous naphtha-insoluble precipitate to appear. This precipitate may subsequently be separated from the mother liquor by filtration and may then be washed with more naphtha, to insure a final product as free as possible from naphtha-soluble impurities. The precipitated oxidized polymers may finally be dried by allowing the occluded naphtha to evaporate by any suitable means, leaving a product which is dry to the touch, and relatively insoluble in ordinary petroleum naphtha at room temperature. The apparently dry resin may be freed from further quantities of naphtha by gentle heating. If the temperature is raised sufficiently, the resin will melt, leaving the residual naphtha as a supernatent layer, which may be drained off.

One specific example of the method which I employ follows: One thousand parts by weight of polymers of 40% solids content (as measured by the standard A. S. T. M. test for varnish treating) was admixed with a solution containing a half part of manganese metal in soap combination, and blown at 175° F., with a brisk current of air which was sufficient to cause violent agitation of the polymers. These polymers had been prepared by allowing vapors from unrefined vapor phase cracked gasoline to pass through a bed of active clay at a temperature between 300° and 400° F., the polymers having been drained from the base of the clay tower and fractionated until the residue contained 40% solids. During the flowing of the polymers, which took place in a still connected with a series of condensing coils, a considerable portion of the volatile ingredients of the polymers was evaporated and condensed. These condensed portions were returned periodically to the residual polymers in the still; and blowing was continued for twenty-four hours, at which time the formation of naphtha-insoluble oxidized polymers had largely ceased, as measured by samples in which one part of polymer was mixed with two parts of cold V. M. & P. naphtha and the proportionate yield of naphtha-insoluble resin determined by weighing. The reacted polymers were removed from the still and mixed at once with 3,000 parts by weight of cold V. M. & P. naphtha. After thorough agitation, the mixture was then subjected to filtration, the precipitate washed with another 1,000 parts of cold V. M. & P. naphtha, and then allowed to dry in shallow trays at room temperature, the powdery product being turned from time to time to expedite the evaporation of the occluded V. M. & P. naphtha. The V. M. & P. naphtha was recovered from the mother liquor by steam distillation, and the remaining mother liquor then added to fresh stock to be reworked.

If desired, the oxidation of the polymers may be carried out with the admixture of vegetable and/or marine drying oils or other substances with which the polymers are miscible.

The product herein described may be used not only as a shellac substitute but as an ingredient in nitrocellulose and cellulose acetate lacquers, blown oil varnishes and other coating and impregnating compositions.

I claim as my invention:

1. An oxidized resin, soluble in furfural and substantially insoluble at room temperatures in ordinary petroleum naphthas, obtained from the molecular oxygen oxidation and subsequent naphtha precipitation of a liquid mass comprising a mineral drying oil and consisting of the residue resulting from the polymerization of cracked gasoline.

2. An oxidized resin, soluble in furfural and substantially insoluble at room temperatures in ordinary petroleum naphthas, obtained from the molecular oxygen oxidation and subsequent naphtha precipitation of a liquid mass comprising a mineral drying oil consisting of the residue resulting from the polymerization of cracked gasoline, said resin being readily compatible with nitrocellulose and cellulose acetate lacquers.

3. A shellac substitute, comprising an oxidized resin substantially insoluble at room temperatures in ordinary petroleum naphthas, derived from the molecular oxygen oxidation and subsequent naphtha precipitation at temperatures below 220° F. of hydrocarbons possessing iodine numbers in excess of 100 and drying times lower than 100 hours, formed by the polymerization of cracked gasoline.

4. The method of manufacturing oxidized furfural-soluble resin, which comprises subjecting furfural-insoluble mineral drying oils, possessing iodine numbers in excess of 100 and drying times lower than 100 hours when reduced to a 50% solids content, and resulting from the polymerization of cracked gasoline, to molecular oxygen oxidation, precipitating resin formed as a result of oxidation by adding to the oxidized oil an ordinary petroleum naphtha, and recovering the precipitated resin.

5. A process as claimed in claim 4, wherein an oil-soluble siccative metallic soap is dissolved in the mineral drying oil to catalyze the oxidation.

6. A process as claimed in claim 4, wherein the molecular oxygen oxidation takes place at temperatures below 220° F.

7. A process such as claimed in claim 4, wherein the final product is washed with an ordinary petroleum solvent until it is freed from impurities.

8. A process such as claimed in claim 4, wherein the oxidation takes place at superatmospheric pressure.

9. The method of manufacturing oxidized furfural-soluble resin, which comprises dissolving an oil-soluble siccative metallic soap in furfural-insoluble mineral drying oil consisting of the residue resulting from the polymerization of cracked gasoline, subjecting said mineral drying oil containing said drier to molecular oxygen oxidation at a temperature below 220° F., precipitating resin formed as a result of oxidation by adding to the oxidized oil an ordinary petroleum naphtha and recovering the preciptated resin.

JULIUS HYMAN.